US005638256A

United States Patent [19]

Leach et al.

[11] Patent Number: 5,638,256

[45] Date of Patent: Jun. 10, 1997

[54] COMBINATION SERVICE ENTRANCE DEVICE FOR TEMPORARY AND PERMANENT USE

[75] Inventors: Thomas C. Leach, Lexington; Kenneth L. Uhlman, Harrodsburg; Larry D. Polston, Nicholasville; James P. Mills, Jr., Lexington, all of Ky.

[73] Assignee: Square D. Company, Palatine, Ill.

[21] Appl. No.: 454,475

[22] Filed: May 30, 1995

[51] Int. Cl.[6] .......... H02B 7/00

[52] U.S. Cl. .......... 361/641; 174/58; 361/664

[58] Field of Search .......... 439/517, 535, 439/540.1; 73/201; 312/223.1; 248/27.1; 174/37, 63, 50, 52.1, 59, 58, 67; 361/622, 659, 641, 652, 656, 664–667, 668; 324/156

[56] References Cited

U.S. PATENT DOCUMENTS

| | | | |
|---|---|---|---|
| 3,458,768 | 7/1969 | Schubert | 361/641 |
| 3,707,652 | 12/1972 | Coffey et al. | 317/120 |
| 3,707,653 | 12/1972 | Coffey et al. | 361/664 |
| 3,783,343 | 1/1974 | Byland | 174/50 |
| 3,858,091 | 12/1974 | Wilkinson | 361/664 |
| 3,906,295 | 9/1975 | Tessmer | 317/107 |
| 3,949,277 | 4/1976 | Yosset | 317/120 |
| 4,443,654 | 4/1984 | Flachbarth et al. | 174/48 |
| 4,532,574 | 7/1985 | Reiner et al. | 361/365 |
| 4,623,859 | 11/1986 | Erickson et al. | 335/14 |
| 4,796,844 | 1/1989 | Barker | 248/222.2 |
| 4,920,476 | 4/1990 | Brodsky et al. | 364/140 |
| 5,180,051 | 1/1993 | Cook et al. | 200/400 |
| 5,301,083 | 4/1994 | Grass et al. | 361/64 |
| 5,404,266 | 4/1995 | Orchard et al. | 361/667 |
| 5,418,683 | 5/1995 | Orchard et al. | 361/672 |

*Primary Examiner*—Gerald P. Tolin
*Attorney, Agent, or Firm*—Larry I. Golden; Kareem M. Irfan

[57] ABSTRACT

The present invention provides an overhead/underground combination service entrance device having a common enclosure that is divided by a center barrier into a first section for housing a watt-hour meter socket and a second section for housing a panel board containing a number of circuit breakers. The top panel of the common enclosure has a hole bringing electrical conductors into the first section from top of the common enclosure. A rain cap made from a suitable material is securely placed on the top panel. The rain cap has a hole therein that lies above the hole in the top panel so as to provide access to the first section from the outside. A hub closure plate is attached on the rain cap to cover sealingly cover the hole in the top panel. Means are provided for mounting the combination service entrance device on a flat surface and on vertical poles for temporary use. The combination device is preferably factory-assembled as a semi-flush-mounted unit and having the provisions for converting the device from a temporary service to permanent service. The combination service entrance device is installed for temporary use at the location where the unit eventually will be installed for permanent use. After sufficient construction has taken place, the rain cap is removed and the device is semi-flush-mounted in a wall for permanent use.

15 Claims, 8 Drawing Sheets

COMBINATION SERVICE ENTRANCE DEVICE FOR TEMPORARY AND PERMANENT USE

BACKGROUND OF THE INVENTION

1. Field of the Invention

This invention relates generally to electrical power distribution apparatus and more particularly to a novel overhead/underground combination service entrance device having a provision for a center-mounted conduit fitting that may be surface-mounted or semi-flush-mounted on a wall, installed on a center-pole, or installed for temporary distribution of power during construction and then converted for permanent use.

2. Description of the Related Art

Combination service entrance devices having a common enclosure for housing a utility meter socket, and a load center or panel board having a service disconnect and a plurality of branch circuit breakers have been gaining commercial use, particularly for use in residential dwellings. The term "combination" refers to the fact that the unit encloses both the mounting provisions for a utility-company watt-hour meter ("meter" ) and a load center or panel board containing circuit breakers for the distribution, control and protection of various circuits in a building.

The utility companies require that the utility meter section of any such combination service entrance device be separated and sealed from the "customer's" side, i.e., the circuit breakers. Therefore, the manufacturers of such devices place a solid barrier at or near the center of the common enclosure to provide two separate sections or compartments: one sealed compartment for housing the meter socket and the other unsealed compartment for housing the panel board. In order to provide access to the meter by the utility companies, the combination service entrance devices are usually installed on the outside.

In some applications, the combination service entrance devices are installed on a center-pole, such as a telephone pole, and the line cables (power lines) are fed from the top of the common enclosure. The center barrier in currently available combination service entrance devices prevents mounting of a top center-mounted fitting which can be connected straight to the conduit carrying line cables. Currently available combination service entrance devices require the installer to either form a conduit offset in the field or purchase a pre-made conduit offset, which is attached between an opening above the utility section and the line conduit carrying line cables. In other applications, especially where the power lines are underground, the line cables are brought into the utility section from the bottom of the utility section. Manufacturers of combination service entrance devices sell separate units for overhead and underground applications, which requires the manufacturers and retailers to stock each type of unit.

It is, thus, desirable to have an overhead/underground combination service entrance device which has provisions for a center-mounted conduit fitting so that the same unit may be mounted on a center-pole without the use of an external offset device or mounted for underground service.

The present invention addresses the above-noted deficiencies and provides an overhead/underground combination service entrance device having a center barrier with an offset that encroaches in the panel board section to provide mounting space for installing a center mounted conduct fitting, thereby eliminating the need for an external conduit offset.

In the majority of the applications, however, the combination service entrance devices are mounted on an outside wall of a dwelling. The devices are usually either surface-mounted or semi-flush-mounted on the wall. In a semi-flush-mounted device about one half (½) of the combination service entrance device is recessed into the wall and the remaining one-half (½) extends beyond the wall and, thus, remains exposed to the outside environment. The top cover portion of the enclosure that is placed within the wall contains all of the holes for running wires. However, the top panel of the common enclosure for a surface-mounted unit contains an opening for connecting line cables through a weather-tight conduit fitting while the remaining top cover is sealed.

Manufacturers of combination devices utilize distinct common enclosures for surface-mounted devices and semi-flush-mounted devices. This requires the manufacturers to produce two types of combination device enclosures and inventory two types of combination devices. Further, this requires retailers to stock separate combination devices for each such application. Accordingly, a need exists to provide a single combination device which may be surface-mounted or semi-flush-mounted.

Additionally, during construction of a building, contractors or builders typically install temporary electrical power service to operate various tools and machinery. The temporary power service typically includes a watt-hour meter to measure power consumption for billing by the utility company, a service disconnect, branch circuit protection and an outlet receptacle for attaching temporary power to one or more extension cords. All such equipment is usually mounted as special devices on poles which are erected at the construction site for temporary use. After the construction has progressed to a certain point, permanent service is connected to the building and the temporary devices are removed. This setting of temporary power service results in undesirable added expense to both the utility company and the builder.

The present invention addresses the above-noted problems with prior art units and provides a overhead/underground combination service entry device which may be semi-flush-mounted or surface-mounted on a wall, mounted on a center-pole without the use of an external conduit offset fitting or mounted for providing temporary service and then readily converted for providing permanent service.

SUMMARY OF THE INVENTION

The present invention provides an overhead/underground combination service entrance device. The combination device contains a common enclosure that is divided by a center barrier into a first section for housing a watt-hour meter socket and a second section for housing a panel board containing circuit breakers. The center barrier is offset at the top a predetermined distance to encroach into the panel board section so as to provide adequate space to install a center-mounted hub on the top of the common enclosure. Knock-out holes are provided in the bottom panel and along the back half of the top panel for running desired wires and cables to and from the common enclosure. Suitable mounting means, such as knock-out screw holes, are provided substantially along the middle of each side of the common enclosure for mounting flanges for semi-flush-mounting of the common enclosure on a wall. Additional knock-out holes may be provided on the top panel for routing wires to and from the common enclosure. A plurality of knock-out holes also are provided at the back panel of the common enclosure for flush-mounting the common enclosure on the wall.

In one embodiment of the combination device, a rain cap made from a suitable material and having a hole that matches the center-mounted hub hole is attached to the top panel so as to sealingly cover all the knock-out holes in the top panel. A hub closure plate is attached on the rain cap to cover the center hole. Means are provided for mounting this combination device on a flat surface and on vertical poles for temporary use. In this embodiment the combination device is preferably factory assembled as a semi-flush-mounted unit and having the provisions described above for converting such device from a temporary service to permanent service. The device is installed for temporary use at the location where the unit eventually will be installed for permanent use. After sufficient construction has taken place, the rain cap is removed and the device is semi-flush-mounted in the wall.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENTS

Figure 1:
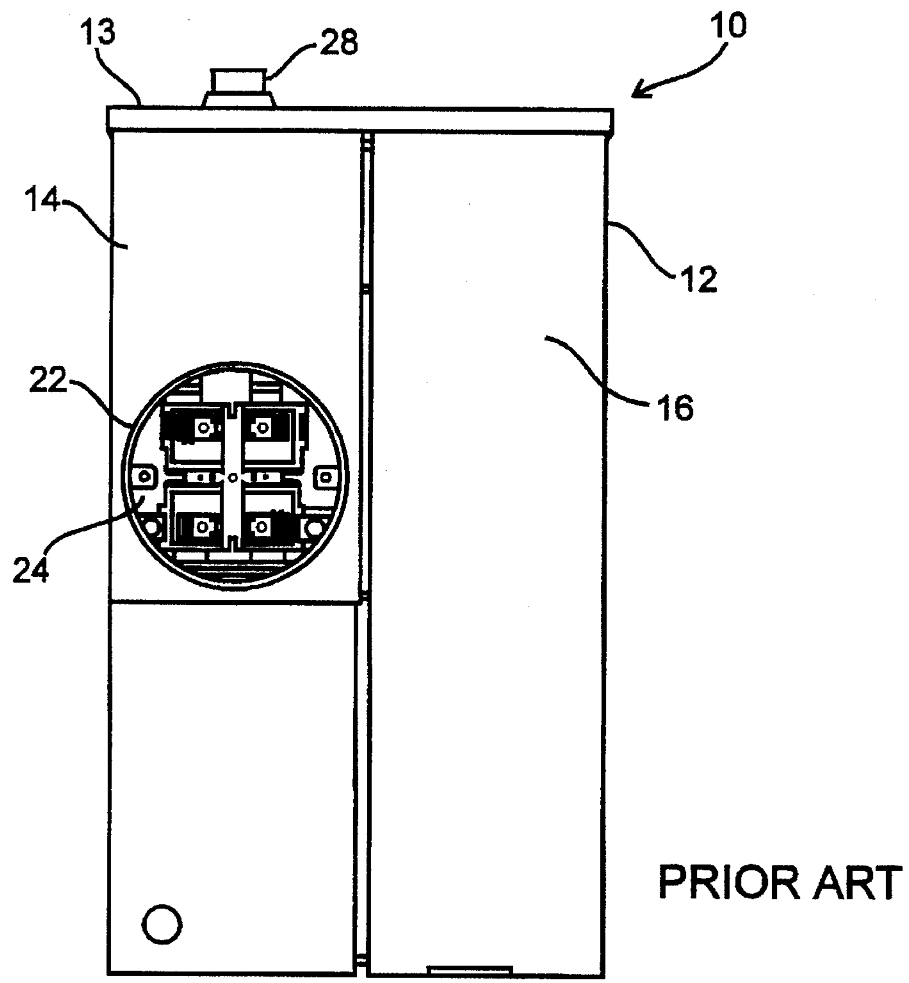
FIG. 1 shows the front exterior view of a prior art combination service entrance device having a center barrier.

FIG. 1 shows a front exterior view of typical prior art side-by-side combination service entrance device 10 having a unitary (common) enclosure 12 that is partitioned by a solid center barrier 18 into a utility section 14 and a panel board section 16. The center barrier 18 is usually placed at or near the center of the common enclosure and runs vertically the entire height of the common enclosure 12. The center barrier 18 prevents mounting of a top center-mounted conduit fitting for center-pole mounting applications. Due to the presence of the center barrier 18 in the middle of the top panel 13, provision 28 for running line cables into the utility section 14 are off-centered over the utility section 14 which, as noted earlier, requires the installer to either form in the field or procure a pre-fabricated offset conduit that is attached between the center line conduit and a hole placed in the top panel above the utility section 14.

Figure 2A:
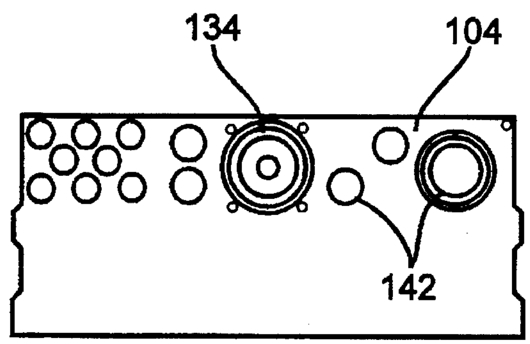
FIG. 2A shows a top view of the combination service entry device of FIG. 2.
Figure 2:
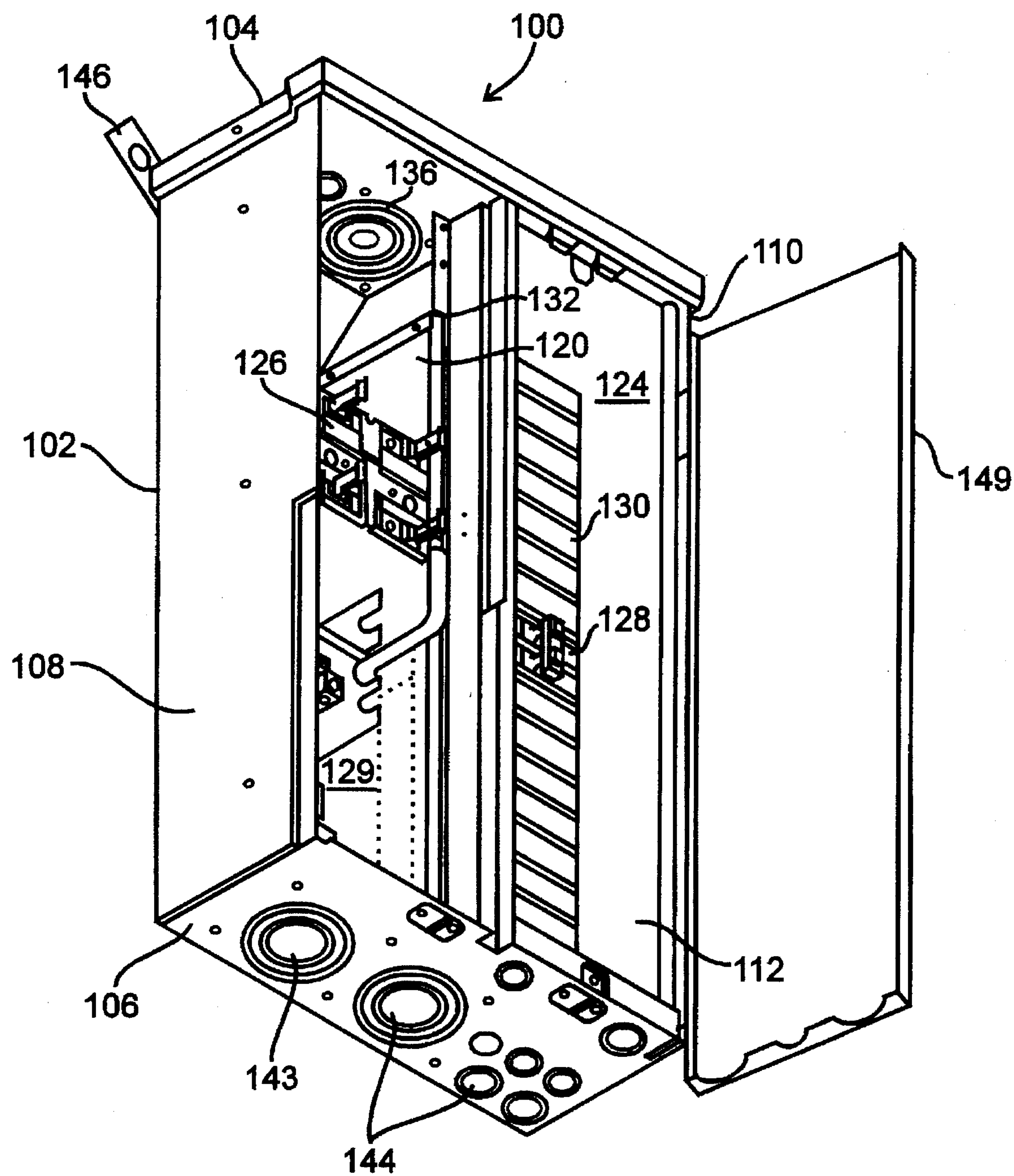
FIG. 2 shows an isometric view of a combination service entrance device having an offset in the center barrier and provisions for mounting a center conduit hub according to the present invention.

FIGS. 2 through FIG. 7 show preferred embodiments of the combination service entrance device according to the present invention. FIG. 2 is an isometric view of a combination device which is generally designated herein by numeral 100. The combination device 100 contains a unitary box-like rectangular common enclosure 102 having a top panel 104, bottom panel 106, left side panel 108, right side panel 110, and back panel 112. The common enclosure 102 preferably is made from a suitable metal and may be treated with a corrosion-resistant zinc finish and electrostatically-deposited painted surface to provide protection from the outside environment. A solid center barrier 120 divides the common enclosure 102 into a utility compartment or section 122 for housing a watt-hour meter socket 126 and a customer compartment or section 124 for housing therein a panel board having a service disconnect 128 and a plurality of circuit breakers 130.

As noted earlier, the utility companies require that the utility section of any combination service entry device be separated and sealed from the customer section. To segregate and seal the utility section 122 from the customer section 124 and to provide provisions for mounting a center-mounted hub 140 (see FIG. 3) on the top panel 104, the solid center barrier 120 is fixedly placed straight inside the common enclosure 102 from the inside of the bottom panel 106 of the common enclosure 102 up to a convenient point 132 and is then placed at a suitable angle 133 toward the customer section 124, i.e., the top section of the barrier 120 is off-set encroaching into the top section of the customer section 124 up to a distance that will provide sufficient space at the center of the top panel 104 for mounting a hub that may be connected to a conduit of a desired dimension carrying line cables to the meter socket 126 without the use of any external off-set device.

Figure 3:
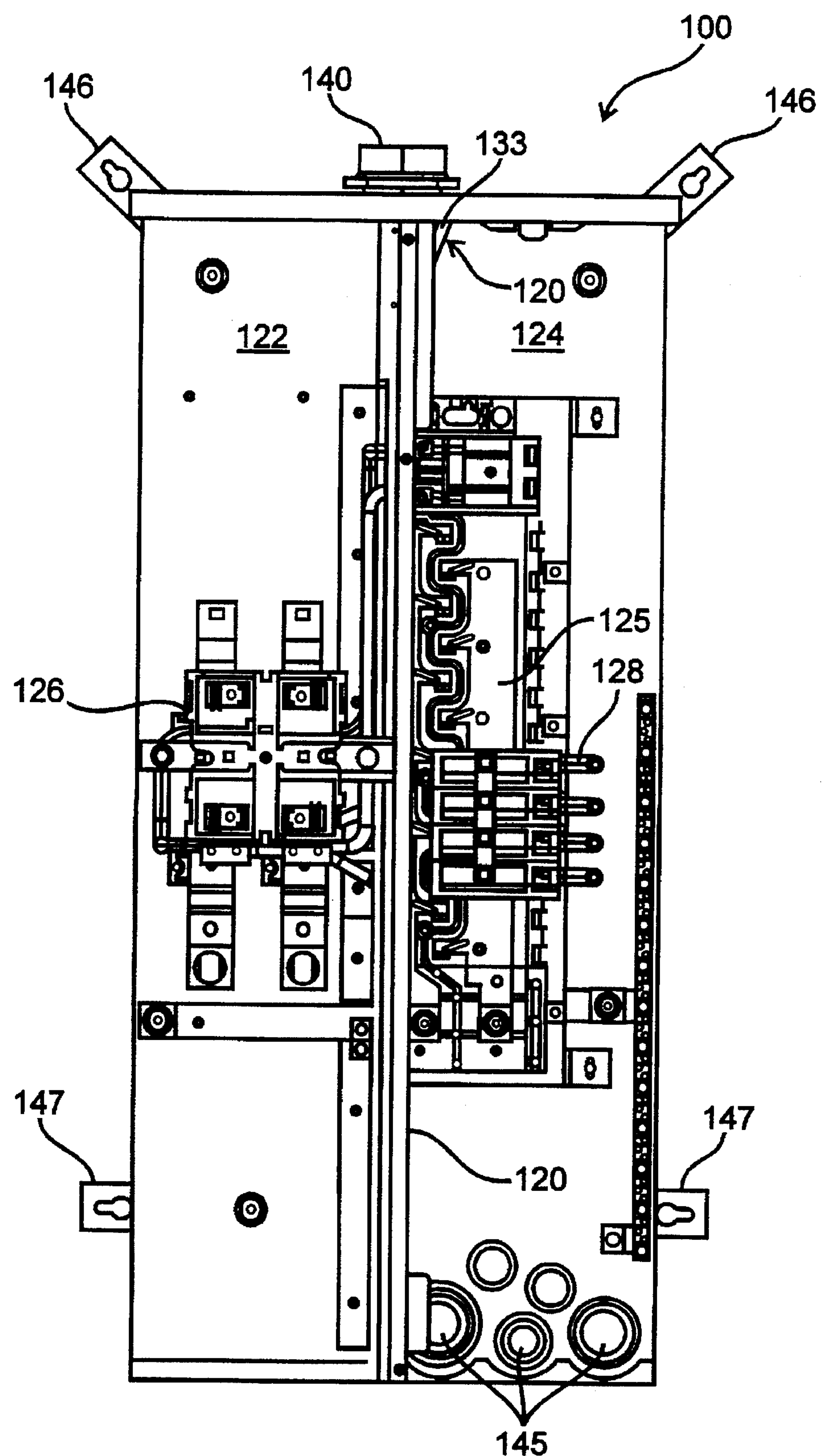
FIG. 3 shows the front elevational view of the combination service entrance device of FIG. 2 having a center hub and surface mounting provisions.
Figure 4:
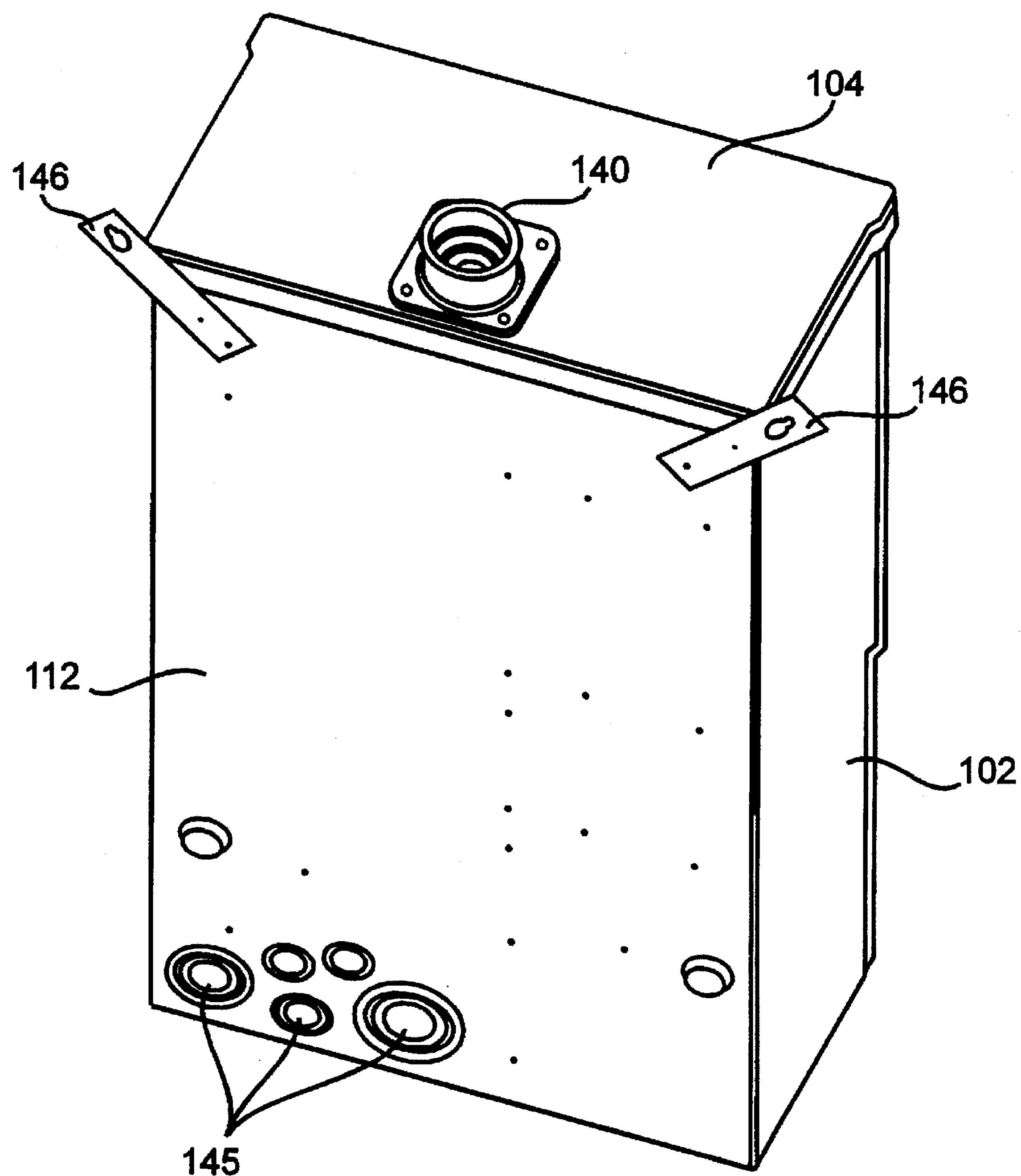
FIG. 4 is an isometric view of the combination service entrance device with a center hub and surface mounting means.

A knock-out hole 136 (FIG. 2) is provided at the center of the top panel 104 for installing thereat a center-line hub 140 (see FIG. 3–4). A desired number of additional knock-out holes, generally designated herein by numeral 142 (FIG. 5)are provided at the top panel 104 for running wires and cables to and from the combination device 100 (see FIG. **2*a*). A knock-out hole 143 is provided in the utility section side of the bottom panel for 106 bringing underground line cables into the utility section 102. Additional knock-out holes, generally designated by numeral 144, are provided at the bottom panel 106 for running wires and cables to and from the combination device 100. Additionally, knock-out holes, generally designated herein by numeral 145, may be placed in the back panel 112 for providing access to the customer section 124 (see FIG. 4**).

The combination service entrance device 100 described above may be surface-mounted or semi-flush-mounted on a wall. For surface-mounting the combination device, attachment members 146, as shown in FIG. 3 and 4 and additional attachment members 147 as shown in FIG. 3 are attached at the back panel 112 of the common enclosure 102. Screws or any other desired means may be used to place the combination unit 100 on a substantially flat surface, such as a wall.

Figure 5:
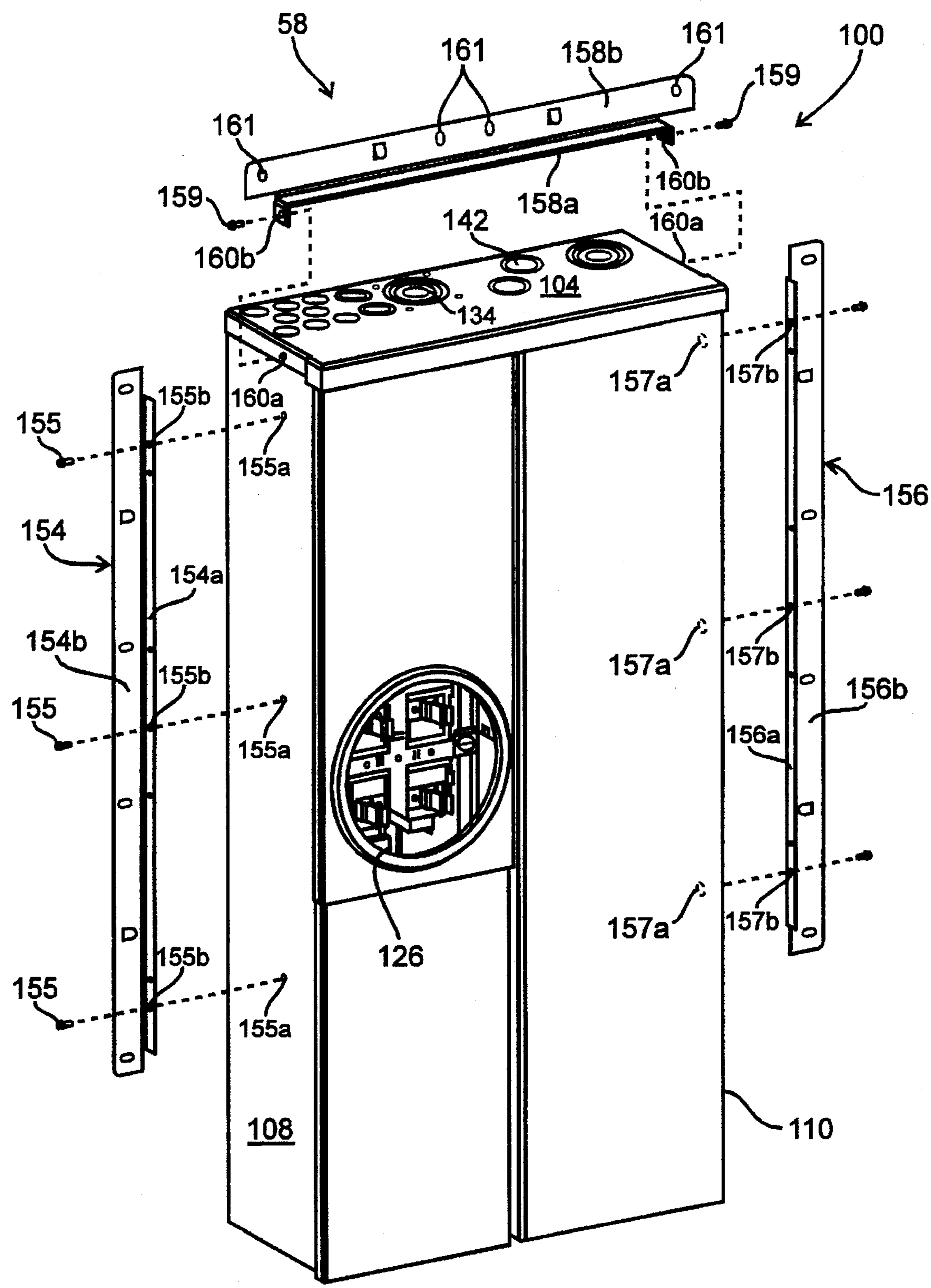
FIG. 5 shows the combination service entrance device of FIG. 2 with semi-flush-mounting attachment means.

FIG. 5 shows an embodiment for semi-flush-mounting the combination service entrance device 100 on a wall. Flanges 154 and 156 are respectively attached along the vertical side of the left side panel 108 and the right side panel 110. The flange 154 has a member 154*a* that may be securely attached to the left side panel 108 by screws 155 placed through holes 155*b* in the member 154*a* and holes 155*a* in the left side panel 108. A second member 154*b*, securely attached to the first member 154*a*, is similarly attached to a suitable post in the wall. Similarly, a flange 156, having members 156*a* and 156*b*, is attached to the right side panel 110 of the common enclosure 102 by screws 157 placed in matching holes 157*b* in the member 156*a* and holes 157*a* in the right side panel 110. Additionally, a member 158 having a first member 158*a* with a flat surface and a second member 158*b* having a vertical surface may be used to attach the top panel 104 of the common enclosure 102 to the wall. The flat surface of the member 158*a* is conveniently attached to the top panel 104 with screws 159 placed in matching holes 160*a* and 160*b* respectively in the top panel 104 and the member 158*a*. The member 158 is placed in front of all the knock-out holes 134 and 142, so that when the combination unit 100 is installed in a wall all the holes 134 and 142 remain inside the wall. The vertical surface member 158*b* is attached to a suitable place on the wall by screws placed through holes 161.

As noted earlier, during building construction electrical power must be provided to operate various tools and machinery. A number of ways have been used to supply such temporary power during construction. Due to the load requirements and the length of construction time involved, contractors typically install temporary utility power service at the construction site. Such service requires a watt-hour meter to measure power consumption, a service disconnect, a branch circuit breaker of some type and an outlet receptacle for connecting extension cords to the power supply. The National Electric Code requires that any such receptacle to have a ground fault protection.

Contractors typically install the above-noted equipment as special devices on a temporarily erected pole. Instead of installing temporary power as described above, some contractors modify currently available combination service entrance devices that are designed for semi-flush-mounting applications. Such modifications require the contractor to add and remove fasteners inside the common enclosure after the power has been turned on. Further, such combination devices are neither rain proof until such units are installed within a wall, which can take several months, nor are such devices UL listed for temporary use. Such modifications and use violate the UL listing and the National Electric Code.

Figure 6:
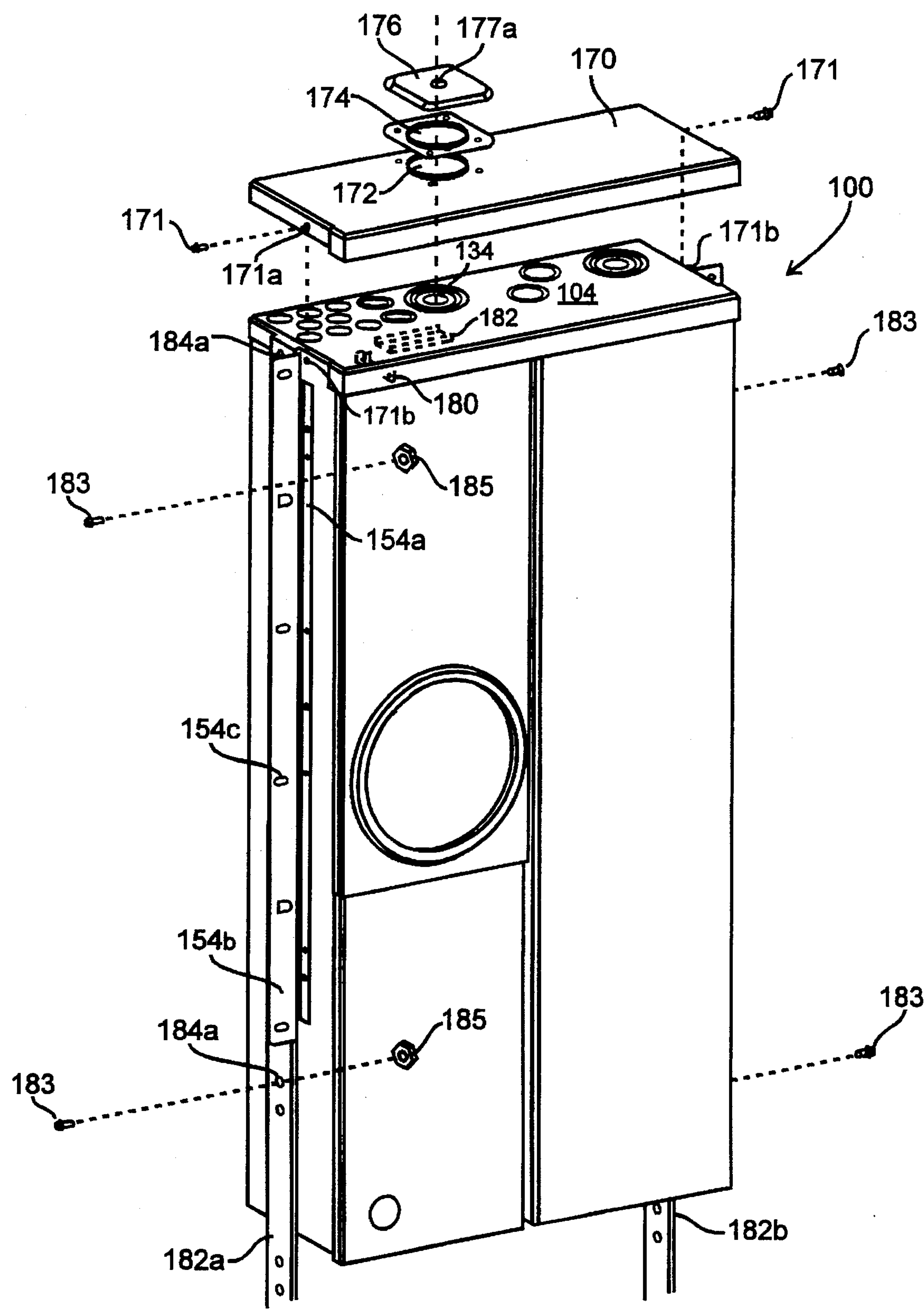
FIG. 6 shows the combination service entrance device of FIG. 2 having a top cover plate and mounting means for installing the device for providing temporary service.

FIG. 6 shows an embodiment of the combination device 100 which may be utilized for providing temporary electrical power during construction and then converted to a surface-mounted or semi-flush-mounted device, or mounted on a center-pole. This combination service entrance device can be UL listed for temporary use. The combination device is preferably factory-assembled as a semi-flush-mounted device and having the provisions for installing the device for providing temporary service.

Still referring to FIG. 6, rain cap 170 having inside dimensions that substantially match the outside dimensions of the top panel 104 is securely placed on the top panel 104 by screws 171 placed in matching holes 171*a* in the rain cap 170 and 171*b* in the common enclosure 102. A through hole 172 made in the rain cap 170 that substantially matches the center hole 134 in the top panel 104 provides access to the inside of the common enclosure 102. A hub closure plate 176 having dimensions larger than the hole 172 is securely and sealingly placed on the rain cap 170 to completely cover the hole 172. The hub closure plate 176 is preferably secured on the top panel 104 by a screw 172 inserted in a center hole 177*a* on the hub closure plate 176 and a wing nut 180 placed inside the common enclosure 102 below the top plate 104. A gasket 174 may be placed between the hub closure plate 176 and the rain cap 170 to seal against water leaks into the common enclosure 102. Alternatively, a rain-proof hub 140, as shown in FIGS. 3 and 4, may be installed at the factory along with attachments for surface mountings 146 and 147.

To install the combination service entrance unit 100 for temporary service, the flanges 182*a* and 182*b* are either placed in concrete or attached to vertical posts at the location where the combination device will eventually be placed for permanent use. FIG. 6 shows one means of mounting the combination service entrance device 100 for temporary use which contains holes 184*a* in the left side 108 (FIG. 5) and right side 110 (FIG. 5). The mounting holes 184*a* preferably are small knock-outs or key-holes or shaped knock outs, which remain sealed until the combination device 100 ready for installation. To mount the combination device 100 for temporary service, screws 183 are inserted through holes 184*a* in temporary mounting poles 182*a* and 182*b*. The screws 183 then pass through temporary mounting poles 182*a* and 182*b* and into the holes 184*b* in the side panels 108 and 110 of the common enclosure 102. A nut 185 is placed on each of the screws 183 from the inside of the common enclosure 102. After the construction has progressed to a desired point, the combination device 100 is converted for permanent use. This conversion takes place by removing the attachment screws 171 and removing the cap 170 (FIG. 6). The flange member 158 (FIG. 6) is replaced with attachment screws 159, which are the same as the attachment screws 171. Either the left temporary mounting post 182*a* or the right post 182*b* is first cut off at the building foundation and the mounting screws 183 and nuts 185 are removed. A permanent wall post is erected and attached to the mounting holes 154*b* using a suitable fastener such as nails or screws. A similar procedure is followed for removing the other mounting post and replacing it with a permanent wall post.

Figure 7:
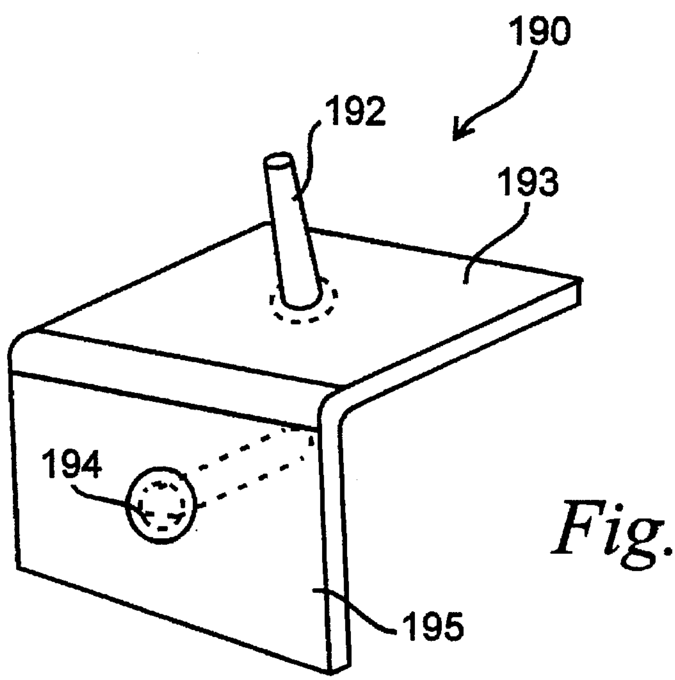
FIG. 7 shows an alternate attachment means for mounting the service entrance device for temporary service.
Figure 7A:
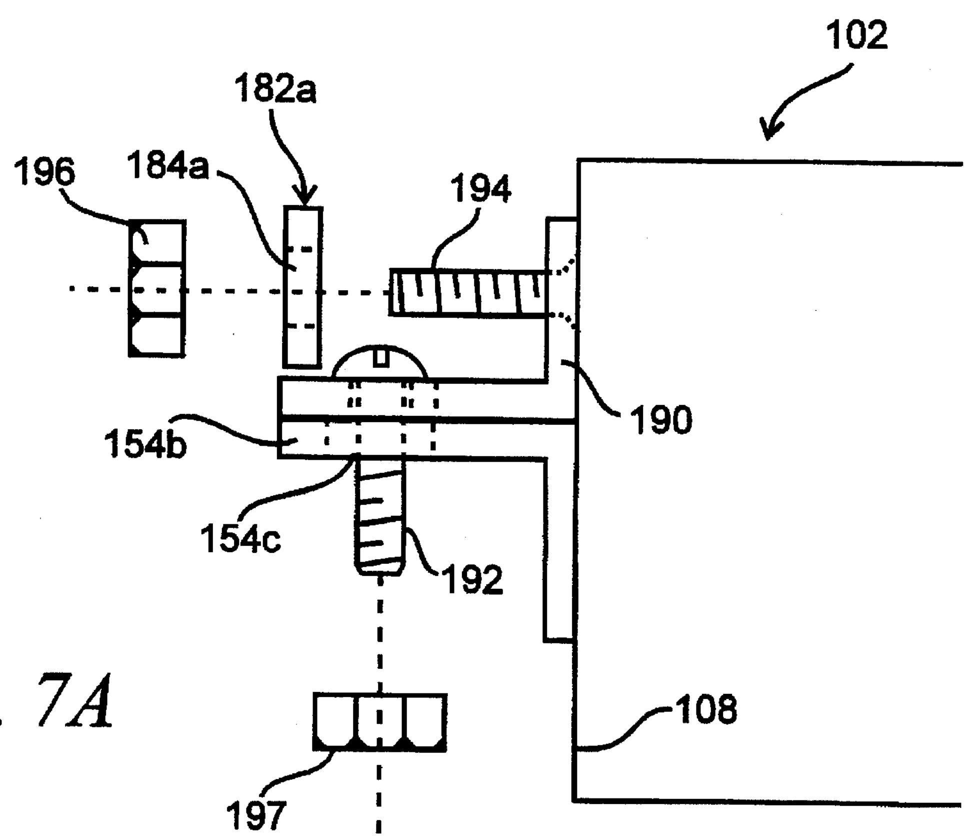
FIG. 7*a* shows the manner of connecting the attachment means shown in FIG. 7 to the common enclosure of the combination device of FIG. 2.
Figure 7B:
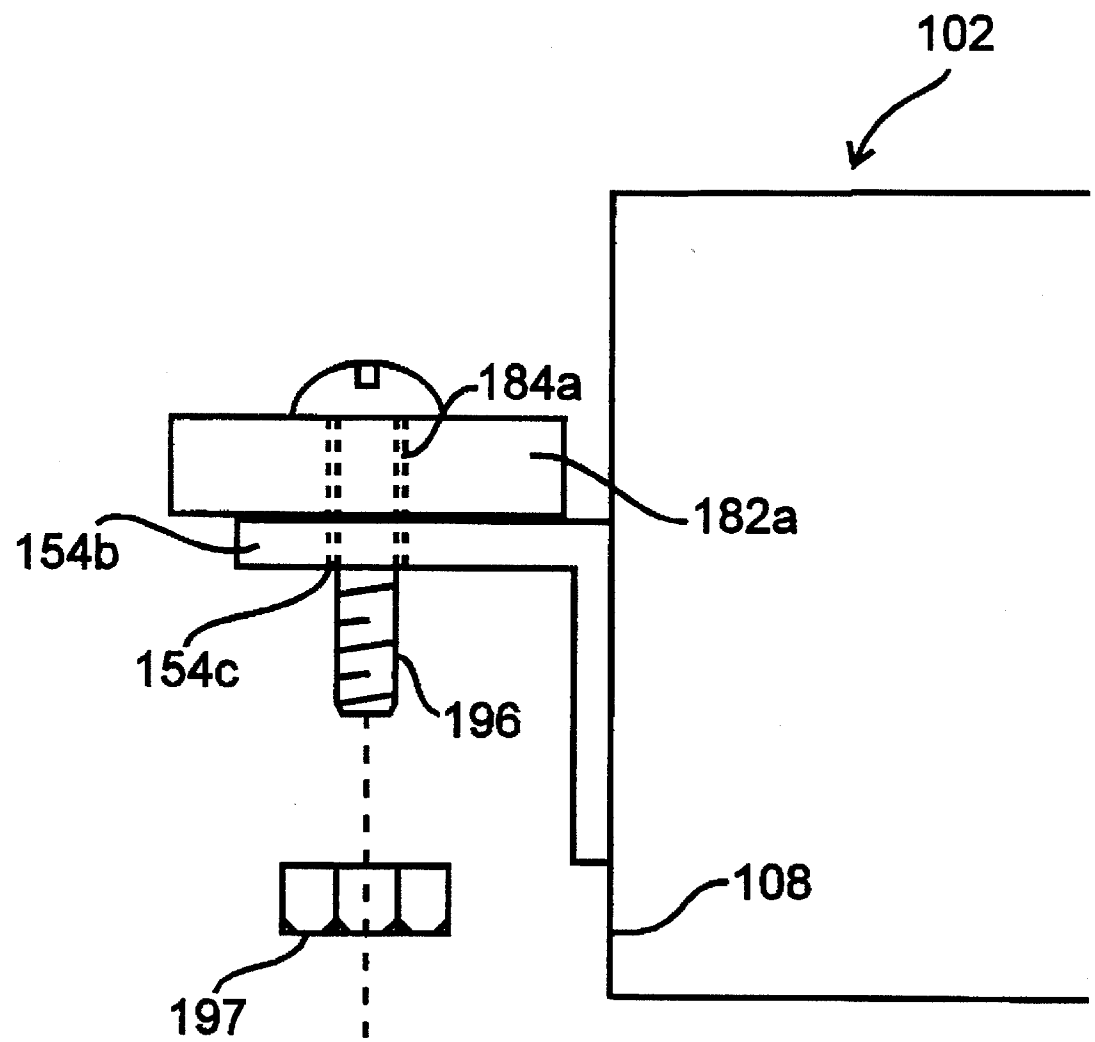
FIG. 7*b* shows an alternate means for attaching the combination device of FIG. 2 for temporary service.

FIG. 7 and FIG. 7*a* show an alternative means for attaching the temporary posts 182*a* and 182*b* respectively to the semi-flush mounting flanges 154*b*. This mounting method is desirable because it does not require additional holes in the side panels 108 and 110 of the common enclosure 102. It also does not require the installer to work inside the enclosure near electrically live elements during the conversion process. In FIGS. 7 and 7*a* a right-angle bracket 190 is shown with a screw 192 on the first side 193 and a screw 194 on the second side 195. The screw 192 is placed into the hole 154*c* on the mounting flange 154*b* and the nut 185 is used to attach the right-angle bracket 190 to the member 154*b*. This is preferably done at four places: two convenient places on the left panel 108 and two convenient places on the right panel 110 of the common enclosure 102. Temporary mounting posts are then attached to the right angle brackets 190. Screws 194 are placed into the holes 184*a* on the temporary mounting posts 182*a* and 182*b*. A separate nut 195 is then placed onto the screw 194 to attach the temporary mounting posts 182*a* and 182*b* to the right angle brackets 190. The conversion process from the temporary to permanent installation proceeds as described earlier.

Yet another mounting arrangement shown in FIG. **7*b* is to place the temporary mounting posts 182*a* and 182*b* respectively, rotated 90 degrees from that shown in FIG. 6, and attach them directly to the semi-flush mounting flanges 154*b* using attachment screws 196 and 197**. The conversion process would proceed in the manner described earlier.

From the description given above, it should be clear that the same combination service entrance device 100 may be used as surface-mounted or semi-flush-mounted in a wall, or mounted on a center-pole or first mounted to provide temporary service and then readily converted for permanent use. The above described configurations of the combination service entrance device utilize the same common enclosure and the desired attachment materials may be provided as kits. Neither the manufacturer of such combination service entrance units or the retailers would need to stock application-specific combination devices. The rain cap and any other mounting means may be provided in the form of kits which are relatively inexpensive. Thus, the same combination service entrance unit may be utilized for multiple applications by merely using the kit that is designed for the desired mounting method.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A combination service entrance device, comprising:

(a) an enclosure having a first section for housing a meter socket and a second section for housing a plurality of circuit breakers, said enclosure having a top panel with an opening therein for providing access to the first section, a left side panel and a right side panel;

(b) a cover plate securely placed on the top panel, said cover plate having a through opening for providing access to the first section ;

(c) a cap placed on the opening in the cover plate to sealingly cover the through opening in the cover plate from any outside environment;

(d) separate first mounting members attached on the left side panel and the right side panel for mounting the combination service entrance device on a wall; and (e) separate second mounting members extending beyond the sides of the enclosure securely attached to the left side panel and the right side panel for fixedly placing the enclosure on a second surface.

2. The apparatus as specified in claim 1, wherein the first mounting members are flange members and each of the second mounting members is attached to an associated first mounting member.

3. The apparatus as specified in claim 1, wherein the second mounting members are attached directly to their respective side panel.

4. The apparatus as specified in claim 3, wherein the second mounting members are attached to their respective panels by means of screws.

5. The apparatus as specified in claim 1, wherein the top panel has a front side and a back side and the opening in the top panel is placed substantially in the middle of the back side.

6. The apparatus as specified in claim 1, wherein the enclosure has a back side which contains mounting means for surface-mounting the combination entrance device on a wall.

7. A combination service entrance device, comprising:

(a) an enclosure having a first section containing a meter socket mounting a watt-hour meter and a second section containing at least one circuit breaker, said first and second sections sealed from each other, said enclosure having a top panel with an opening therein for providing access to the first section;

(b) a cover plate removably placed on the top panel for sealingly covering the opening in the top panel;

(c) a first mounting member attached to the enclosure for detachably mounting the enclosure on a first surface; and (d) a second mounting member attached to the enclosure for fixedly mounting the enclosure on a second substantially vertical surface.

8. The apparatus as specified in claim 7, wherein the first mounting member includes two detachable members, one each such detachable member being attached to a separate side of the enclosure.

9. The apparatus as specified in claim 7, wherein the second mounting member is attached to a back side of the enclosure for flush-mounting the enclosure on a substantially flat surface.

10. The apparatus as specified in claim 7, wherein the second mounting member includes two members, one each such member being attached to a separate side of the enclosure for semi-flush mounting the enclosure in a wall.

11. The apparatus as specified in claim 7, wherein the first mounting member is detachably attached to the second mounting member along a side panel of the enclosure in a manner that will allow installing the enclosure on the first surface for a period of time utilizing the first mounting member and then detaching the first member from the enclosure to install the enclosure on the second surface by means of the second mounting member.

12. The apparatus as specified in claim 7, wherein the cover plate has an opening for providing access to the opening in the top panel.

13. The apparatus as specified in claim 12 further having a cap placed on the opening in the removable cover plate for sealingly covering the opening in the cover plate from the outside environment.

14. The apparatus as specified in claim 13, wherein the first mounting member extends beyond the enclosure and is detachably attached to the enclosure.

15. The apparatus as specified in claim 14, wherein the second mounting member is attached to the first mounting member.

* * * * *